US010994267B2

(12) United States Patent
Duisberg et al.

(10) Patent No.: US 10,994,267 B2
(45) Date of Patent: May 4, 2021

(54) VANADIUM TRAPPING SCR SYSTEM

(71) Applicant: UMICORE AG & CO. KG, Hanau-Wolfgang (DE)

(72) Inventors: Matthias Duisberg, Frankfurt (DE); Alain Ristori, Oberursel (DE); Stephan Malmberg, Frankfurt (DE); Marcus Pfeifer, Solingen (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 16/316,781

(22) PCT Filed: Jul. 14, 2016

(86) PCT No.: PCT/EP2016/066813
§ 371 (c)(1),
(2) Date: Jan. 10, 2019

(87) PCT Pub. No.: WO2018/010804
PCT Pub. Date: Jan. 18, 2018

(65) Prior Publication Data
US 2019/0232264 A1 Aug. 1, 2019

(51) Int. Cl.
| | | |
|---|---|---|
| *B01J 29/76* | (2006.01) |
| *B01J 29/85* | (2006.01) |
| *B01D 53/94* | (2006.01) |
| *B01J 29/46* | (2006.01) |
| *B01J 23/22* | (2006.01) |
| *F01N 3/10* | (2006.01) |
| *F01N 3/20* | (2006.01) |
| *B01J 37/02* | (2006.01) |
| *B01J 35/04* | (2006.01) |
| *B01J 29/072* | (2006.01) |
| *B01J 29/44* | (2006.01) |
| *B01J 29/74* | (2006.01) |
| *B01J 29/72* | (2006.01) |
| *B01J 23/44* | (2006.01) |
| *B01J 23/89* | (2006.01) |

(52) U.S. Cl.
CPC .......... *B01J 29/85* (2013.01); *B01D 53/9418* (2013.01); *B01D 53/9436* (2013.01); *B01D 53/9477* (2013.01); *B01J 23/22* (2013.01); *B01J 23/44* (2013.01); *B01J 23/8926* (2013.01); *B01J 29/072* (2013.01); *B01J 29/44* (2013.01); *B01J 29/46* (2013.01); *B01J 29/7215* (2013.01); *B01J 29/743* (2013.01); *B01J 29/7415* (2013.01); *B01J 29/76* (2013.01); *B01J 29/763* (2013.01); *B01J 29/7615* (2013.01); *B01J 35/04* (2013.01); *B01J 37/0246* (2013.01); *F01N 3/106* (2013.01); *F01N 3/2066* (2013.01); *B01D 2251/2062* (2013.01); *B01D 2255/1023* (2013.01); *B01D 2255/20723* (2013.01); *B01D 2255/20738* (2013.01); *B01D 2255/20761* (2013.01); *B01D 2255/50* (2013.01); *B01D 2258/012* (2013.01); *B01J 2229/18* (2013.01); *B01J 2229/20* (2013.01); *B01J 2229/36* (2013.01); *F01N 2370/04* (2013.01); *Y02T 10/12* (2013.01)

(58) Field of Classification Search
CPC .... F01N 3/106; F01N 3/2066; F01N 2370/04; B01D 2255/50; B01D 2255/502; B01D 2255/504; B01D 2255/20723; B01D 2251/2062; B01D 2258/012; B01D 53/9477; B01D 53/9436; B01D 53/9418; Y02T 10/24; B01J 35/04; B01J 37/0246; B01J 29/7615; B01J 29/7415; B01J 29/072; B01J 29/763; B01J 29/44; B01J 29/46; B01J 29/743; B01J 29/85; B01J 2229/18; B01J 2229/20; B01J 2229/36; B01J 29/7215
USPC ............ 502/60, 69, 71, 74, 77, 214, 527.24, 502/527.12; 422/177, 180; 423/212, 423/213.2, 213.5, 213.7, 235, 237, 239.1, 423/239.2
See application file for complete search history.

(56) References Cited

U.S. PATENT DOCUMENTS

| | | |
|---|---|---|
| 7,722,845 B2 | 5/2010 | Caudle et al. |
| 2010/0166628 A1 | 7/2010 | Soeger et al. |
| 2011/0138789 A1 | 6/2011 | Chapman |
| 2015/0023853 A1 | 1/2015 | Wittrock et al. |
| 2016/0045868 A1 | 2/2016 | Sonntag et al. |
| 2016/0107150 A1 | 4/2016 | Thomas et al. |
| 2019/0232224 A1* | 8/2019 | Adelman ................ F01N 3/035 |

FOREIGN PATENT DOCUMENTS

| | | |
|---|---|---|
| CN | 1226464 A | 8/1999 |
| CN | 102869862 A | 1/2013 |
| CN | 104297100 A | 1/2015 |
| CN | 104628087 A | 5/2015 |
| EP | 2 029 260 B1 | 11/2012 |
| EP | 2 826 971 A1 | 1/2015 |
| EP | 1 784 258 B1 | 5/2015 |
| EP | 3 015 167 A1 | 5/2016 |
| JP | 2005-201282 A | 7/2005 |
| JP | 2013/513478 A | 4/2013 |
| JP | 2015/20166 A | 2/2015 |

(Continued)

OTHER PUBLICATIONS

Office Action for Japanese Patent Application No. 2019/501549 dated Jun. 8, 2020 (5 pages with English translation).

(Continued)

*Primary Examiner* — Elizabeth D Wood
(74) *Attorney, Agent, or Firm* — Smith, Gambrell & Russell, LLP

(57) ABSTRACT

The present invention is directed towards the use of an ion-exchanged zeolite containing ASC as a trap for volatile vanadium compounds in a downstream position of a vanadium containing SCR-catalyst.

22 Claims, 2 Drawing Sheets

(56) References Cited

FOREIGN PATENT DOCUMENTS

| WO | 2010/062730 A2 | 6/2010 |
|---|---|---|
| WO | 2011/081727 A1 | 7/2011 |
| WO | 2011/127505 A1 | 10/2011 |
| WO | 2015/128247 A1 | 9/2015 |
| WO | 2015/187550 A2 | 12/2015 |
| WO | 2016/024126 A1 | 2/2016 |
| WO | 2017/005779 A1 | 1/2017 |

OTHER PUBLICATIONS

International Search Report for PCT/EP2016/066813, dated Mar. 27, 2017 (3pgs.).
International Organization for Standardization (ISO), Wasserbeschaffenheit—Bestimmung von ausgewählten Elementen durch induktiv gekoppelte Plasma-Atom-Emmissionsspektrometrie (ICP-OES) (ISO 11885:2007); Deutsche Fassung EN ISO 11885:2009; Sep. 2009 (37 pages).
GB (English Language) Abstract ISO 11885:2007 Water Quality—Determination of Selected Elements by Inductively Coupled Plasma Optical Emmission Spectrometry (ICP-OES) (38 pages).
Written Opinion of the International Searching Authority for International Patent Application No. PCT/EP2016/066813 dated Mar. 27, 2017 (6 pages).
International Preliminary Report on Patentability for International Patent Application No. PCT/EP2016/066813 dated Jan. 15, 2019 (7 pages).
Brandenberger, S. et al., The State of the Art in Selective Catalytic Reduction of NOx by Ammonia Using Metal-Exchanged Zeolite Catalysts. Catalysis Reviews. 2008. vol. 50. pp. 492-531.
Schmieg. S. J. et al. Evaluation of Supplier Catalyst Formulations for the Selective Catalytic Reduction of NOx with Ammonia. SAE International. SAE 2005-01-3881. 2005 (11 pages).
Girard, J. W. et al. Technical Advantages of Vanadium SCR Systems for Diesel NOx Control in Emerging Markets. SAE International Journal of Fuels and Lubricants. SAE 2008-01-1029. 2008. pp. 488-494.
Nova, I. et al. $NH_3$-SCR of NO over a V-based Catalyst: Low-T Redox of Kinetics with $NH_3$ Inhibition. Journal of the American Institute of Chemical Engineers. 2006. vol. 52, pp. 3222-3233.
Johnson, T. Diesel Engine Emissions and Their Control. Platinum Metals Review. 2008. vol. 52. pp. 27-30.
Chapman, D. M. Behavior of titania-supported vanadia and tungsta SCR catalysts at high temperatures in reactant streams: Tungsten and vanadium Oxide and hydroxide vapor pressure reduction by surficial stabilization. Applied Catalysis A: General. 2011. vol. 392. pp. 143-150.
U.S. Environmental Protection Agency. Enclosure to CD-16-09. Recommendation of Sampling and Analytical Method for the Analysis of Sublimation Based Vanadium from SCR Catalysts. 2015. https://iaspub.epa.gov/otaqpub/display_file.jsp?docid=36863&flag=1 accessed Apr. 10, 2019.
U.S. Environmental Protection Agency. Webinar Presentation Nonroad SCR Certification. http://www.epa.gov/otaq/cert/documents/nrci-scr-web-conf.2011-07-25.pdf accessed Apr. 10, 2019, (22 Pages).
Krocher, O. et al. Combination of $V_2O_5/WO_3$—$TiO_2$, Fe-ZSM5, and Cu-ZSM5 Catalysts for the Selective Catalytic Reduction of Nitric Oxide with Ammonia. Industrial & Engineering Chemistry Research. 2008. vol. 47, No. 22. pp. 8588-8593.
Indian Examination Report dated Nov. 4, 2020 for Indian Patent Application No. 201947004995 (5 pages).
Chinese Office Action dated Jan. 20, 2021 for Patent Application No. 201680087580.X (7 pages in Chineese with English translation).

* cited by examiner

VANADIUM TRAPPING SCR SYSTEM

The present invention is directed towards the use of an ion-exchanged zeolite containing ASC in a downstream position of a vanadium containing SCR-catalyst.

The exhaust gas of combustion processes, in particular that of diesel engines, but also that of direct-injection lean-mixture-operated gasoline engines, also contains particulate matter (PM) and nitrogen oxides (NOx) in addition to the harmful gases carbon monoxide (CO) and hydrocarbons (HC) resulting from incomplete combustion of the fuel. Furthermore, the exhaust gas of diesel engines contains, for example, up to 15 vol % oxygen. It is known that the oxidisable harmful gases CO and HC can be converted to harmless carbon dioxide ($CO_2$) and water ($H_2O$) by passing them over suitable oxidation catalytic converters and that particulates can be removed by passing the exhaust gas through a suitable particulate filter.

Technologies for the removal of nitrogen oxides from exhaust gases in the presence of oxygen are also well known from the prior art. The SCR-method is one of these "denitrification methods." Here, ammonia as such or in the form of a precursor compound decomposable to ammonia under ambient conditions can be added to the exhaust gas stream, "ambient conditions" being understood to mean the current conditions in the spatial area of the exhaust gas stream upstream of the SCR catalytic converter. To perform the SCR method, a source for the provision of the reduction agent, an injection device for metering the reduction agent into the exhaust gas as required and an SCR catalytic converter arranged in the flow path of the exhaust gas are needed. The entirety of the reduction agent source, the SCR catalytic converter, and the injection device arranged upstream of the SCR catalytic converter is also called an SCR-system.

With the future applicable statutory limit values, an after-treatment of exhaust gases for the removal of all harmful gases emitted by the engine will generally be necessary for all newly registered diesel vehicles and direct-injection lean-mixture-combustion gasoline engines. The cleaning efficiency of modern SCR-systems for nitrogen oxides is more than 95% in optimal ranges. This is why the SCR method is currently seen as most promising cleaning method for the denitrification of diesel exhaust gases for applications in passenger cars and for the standard application in commercial vehicles.

As already stated, typically, in a $NH_3$-SCR-system, ammonia or a precursor compound, as a reductant, is injected into an exhaust gas flow of an exhaust gas treatment apparatus provided with a SCR-catalyst. This approach is called "active" SCR process. In a SCR system, when ammonia ($NH_3$) is used as a reductant, there is a problem in that ammonia cannot function as a reductant under the condition of imperfect conversion or a rise in exhaust gas temperature, and may thus leak from an exhaust port to raise ammonia slip attributable to the non-reaction of ammonia with NOx, thus causing secondary pollution. Here, the term "ammonia slip" is referred to as a phenomenon in which ammonia, as a reductant (in the form of urea) injected into a SCR-system in order to remove nitrogen oxides included in exhaust gas discharged from an internal combustion engine, does not participate in the reduction reaction of NOx because of various causes, and is discharged to the outside.

The conversion of the nitrogen oxides can usually be improved by introduction of a 10-20 percent excess of ammonia, but—of course—this also drastically increases the risk of even higher secondary emissions, in particular by increased ammonia breakthrough. Since ammonia is a gas which has a penetrating odor even in low concentrations, it is in practice an objective to minimize ammonia breakthrough. The molar ratio of ammonia to the nitrogen oxides in the exhaust gas is usually designated by alpha:

$$\alpha = \frac{c(NH_3)}{c(NO_x)}$$

In internal combustion engines in e.g. motor vehicles, the precise metering of ammonia presents great difficulties because of the greatly fluctuating operating conditions of the motor vehicles and sometimes leads to considerable ammonia breakthroughs downstream of the SCR-catalyst. To suppress the ammonia breakthrough, an oxidation catalyst is usually arranged downstream of the SCR-catalyst in order to oxidize ammonia which breaks through to nitrogen selectively. Such a catalyst which suppresses the ammonia emissions will hereinafter be referred to as an ammonia slip catalyst or ASC. The ammonia light-off temperature $T_{50}$ ($NH_3$) is reported as a measure of the oxidizing power of the catalyst. It indicates the reaction temperature at which the ammonia conversion in the oxidation reaction is 50%.

ASC which are arranged downstream of an SCR-catalyst to oxidize ammonia which breaks through are known in various embodiments. Thus e.g. EP3015167A1, US2016107150AA, WO15187550 and WO15128247A1 describe such a catalyst.

In an "active" SCR-system for removing nitrogen oxides from the exhaust gas of combustion engines like diesel engines, there is therefore firstly the problem of providing a catalyst and conditions for effective removal of nitrogen oxide by selective catalytic reduction. Secondly, incompletely reacted ammonia and surviving NOx may not be allowed to be liberated into the environment. Hence, the ASC advantageously has to be able to mitigate both of them as much as possible.

Vanadium SCR-catalysts (V-ZSCR) are a prominent class of SCR-catalyst. In fact they were the oldest type of catalytic material initially used in power plant applications for that purpose (Brandenberger et al., Catalysis Reviews 2008 (50) 492-531; SAE2005-01-3881; SAE2008-01-1029; Nova et al., AlChe Journal 2006 (52) 3222-3233; T. Johnson, Platinum Metals Rev. 2008 (52) 27-30). Vanadium-based SCR-catalysts that utilize titania catalyst supports are approved for use for on-road mobile applications in Europe on Heavy-Duty Diesel trucks, and these catalyst are highly active and show excellent tolerance to fuels that contain sulfur. However, vanadium-based catalysts are not approved by the EPA for on-road use in the U.S. or in Japan.

This lack of approval stems from the concern over release of vanadium into the environment and the potential toxicity that might arise from exposure to vanadium emitted from the tailpipe of such vehicles. One possible mechanism that potentially might cause a loss of vanadium from the catalyst is vaporization of the metal oxide or hydroxide at high temperature in the stream of hot exhaust gases. Hence, in the presence of high exhaust gas temperatures (generally 550° C. and higher) vanadium material can sublimate from the catalyst, leading to a possible exposure of the public to vanadium emissions. The vanadium release is an intrinsic material property of the vanadium containing SCR-catalyst being used.

There have been attempts to suppress the volatility of vanadium material in SCR-catalysts (WO2011127505A1)

by amending the chemical composition of such a catalyst. However, the risk of vanadium pollution has not been banned using this method. Concern over the volatility of vanadium at high temperatures, e.g., when the SCR-catalyst is located downstream of a particulate filter DPF, is thus an issue that may limit the available market for vanadium-based mobile SCR-catalysts and is a key consideration in catalyst development. There has thus remained in the art a need to be able to evaluate the degree of vanadium volatilization from SCR-catalysts. Further, there has remained a need in the art for a DeNOx selective catalytic reduction catalyst system which demonstrates zero vanadium emission plus a maximum mitigation of ammonia and NOx-slip. It is an object of the presently disclosed and claimed inventive concepts to address these shortcomings of the prior art.

These shortcomings are overcome by the present invention. In that a Cu- or Fe-exchanged zeolite comprising ASC is used as a trap for volatile vanadium compounds in a $NH_3$-SCR-system comprising a vanadium based upstream SCR-catalyst (V-SCR) and a downstream ASC, the volatile vanadium compounds emerging from the V-SCR can be trapped to the extent that with the standard measurement test no vanadium can be analyzed at the tailpipe of such a SCR-system. In addition the system is able to further mitigate the NOx- and $NH_3$-emissions which otherwise would be expelled to the environment untreatedly. It was known that high surface area refractory oxides, like γ-alumina, are able to trap volatile vanadium materials from a V-SCR in the exhaust system quite effectively. This is greatly attributed to their large external surface area which is exposed to the exhaust gas environment. Zeolites on the other hand do not have such a large external surface area. Rather they possess a large internal surface area being established by pores and channels throughout the internal zeolite framework. It can be taken as a surprise that this internal surface area is as effective in trapping the volatile vanadium materials (in particular the large vanadium oxide molecule) as the known γ-alumina.

As zeolites those known for good SCR-performance can be taken as the ASC and vanadium-trapping material. Of course, these zeolites should also have an advantageously high conversion efficiency for the SCR-reaction. Hence, they have to be ion-exchanged with respective metal cations, like Fe or Cu. This property serves for a further enhancement of the overall NOx-conversion in that NOx- and $NH_3$- breakthroughs can be mitigated to a great extent. Moreover, as already mentioned the ASC has the ability to oxidize $NH_3$ being dedicatedly overdosed or being accidentally slipped over the upstream V-SCR-catalyst. Finally, therefore nearly all primary and secondary emissions stemming from the DeNOx process are dealt with superiorly. The zeolites advantageously used in this invention are selected from the group consisting of BEA, CHA, LEV, AEI, ZSM-5, SAPO-34, or mixtures of these.

The layout of the system according to the present invention comprising an upstream V-SCR and a downstream ASC can be made according to the knowledge of the skilled worker. Several designs have already been proposed in the prior art. E.g. it is possible to apply the ASC on the same brick downstream of the V-SCR-catalyst. Furthermore, it is possible to use the system in the form of a two or more brick arrangement. According to this latter approach the individual catalysts or types of catalysts can be located in different canings which may be advantageous from the viewpoint of flexibility and storage space in the underfloor compartment of the vehicle cabin. In order to further enhance the efficiency of the system an embodiment is preferred in which the ASC is located in the same canning as the SCR-catalyst (e.g. like depicted in FIG. 2/3). If space constraints exist a one brick solution is envisaged which is based on a V-SCR extrudate having on its outlet portion an ASC. In addition the V-SCR can be located at the inlet portion of the brick and at the outlet portion an ASC is established. Outlet in the sense of this invention means a part of a brick or monolith which is beginning at more than 50%, more preferred 60% and further preferred 70% of the length of the brick towards the outlet end of this monolith. Inlet defines a region which is not attributed to the outlet portion.

As already described it is beneficial to have an Cu- or Fe-exchanged zeolite present in the ASC. In addition to trapping the vanadium this measure allows to achieve also improved NOx-conversion over the whole system compared to a system comprising an ASC without the possibility to perform the SCR-reaction. For good SCR-performance it is preferable to have the Cu- or Fe-exchanged in the zeolite in such a way that the ion-exchanged and non-ion exchanged Cu- or Fe-ions are present, preferably in a molar ratio of greater than 90:10 (IE-metal:non-IE-metal). More preferable, the molar ratio is between 80:20 and 20:80. Most preferred is a ratio of 30:70-50:50. Ion-exchanged in the sense of this invention means that the ion compensates at least one negative charge imposed by the framework of the zeolite. The zeolite material used advantageously is an aluminosilicate zeolite which should have an SAR of 10-50, better 15-40 and a metal ion-exchanged to aluminum ratio of 0.3-0.5, better 0.4-0.5 (based on the metal in its oxidation state of +II).

In case the ASC is located on one or more separate bricks downstream of the V-SCR-catalyst this ASC can also have different designs. In a very simple and advantageous embodiment the ASC can contain the Cu- or Fe-exchanged zeolite coated over the total length of the brick. The Cu- or Fe-exchanged zeolite already has an oxidative behavior towards ammonia in the oxygen rich exhaust environment. In order to pronounce this oxidizing effect certain noble metals can be added to the zeolite (U.S. Pat. No. 7,722,845) or be located downstream and/or below of the zeolite in a separate layer or zone (EP1784258B1). A layered design where the noble metals are located below a layer of the Cu- or Fe-exchanged zeolite seems preferable.

As noble metals those of the platinum group in an amount of up to 10 g/ft$^3$, preferably 2-8 and most preferred 3-7 g/ft$^3$ are preferred. Also most preferred are platinum and/or palladium in this respect which can be supported by special high surface area (>50 m$^2$/g) refractory oxides like alumina, silica, titania or zirconia.

In a further embodiment certain layered and/or zoned arrangements of the Cu- and/or Fe-exchanged zeolite and the noble metal, optionally supported on above referenced refractory oxides, are preferred. As such it is most preferred if the layer containing the Cu- and/or Fe-exchanged zeolite contacts the exhaust gas first, before the noble metal containing layer is getting into contact with the exhaust gas conveyed via the ASC. In a very preferred arrangement the Cu- and/or Fe-exchanged zeolite is totally coated over the noble metal containing layer, the latter being located at the outflow of the ASC brick. The Cu- and/or Fe-exchanged zeolite and/or the noble metal containing layer can be coated over part or all of the brick/monolith with the proviso that the Cu- and/or Fe-exchanged zeolite contacts the exhaust gas first, before the noble metal containing layer or zone is getting into contact with the exhaust gas conveyed through the ASC. Further arrangements can be taken from EP2029260B1 or WO2010/062730A1. In a most preferred layout the ASC is comprising a Pt-containing outlet layer of about ⅓-⅔, preferably around half the length of the top layer containing a FeZeo, e.g. FeBEA material. Here the Pt content in the outlet zone is between 2 and 10, more preferred 3-7, and most preferred around 5 g/ft$^3$.

When speaking of zeolites in the context of this invention the following is envisaged: Zeolites are microporous crystalline aluminosilicate materials characterized by well-ordered 3-D structures with uniform pore/channel/cage structures of 3 to 10 Å (depending on framework type) and the ability to undergo ion-exchange to enable the dispersion of catalytically active cations throughout the structure. In addition, zeotypes are encompassed by this definition. Zeotypes are structural isotypes/isomorphs of zeolites but instead of a framework structure derived of linked silica and alumina tetrahedra they are based upon for example; alumina-phosphate (ALPO), silica-alumina-phosphate (SAPO), metal-alumina-phosphate (Me-ALPO) or metal-silica-alumina-phosphate (MeAPSO).

When speaking about bricks or monoliths a honeycomb substrate is meant which in the wall and/or on the wall carries the catalytically active coating. This can be of the flow-through or wall-flow type. Suitable substrates that can be employed are monolithic substrates of the type having fine, parallel gas flow passages extending there through from an inlet or an outlet face of the substrate, such that passages are open to fluid flow there through, named honeycomb flow-through substrates. The passages, which are essentially straight paths from their fluid inlet to their fluid outlet, are defined by walls on which or in which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 400-900 or more gas inlet openings (i.e., cells) per square inch of cross section (62-140 cells/cm$^2$). The wall thicknesses, i.e. the thickness of the walls which separate the channels of the substrate from one another, are usually from about 0.005 cm to about 0.25 cm. The substrate may also be a honeycomb wall-flow filter. Wall-flow substrates useful for supporting the coating compositions have a plurality of fine, substantially parallel gas flow passages extending along the longitudinal axis of the substrate. Typically, each passage is blocked at one end of the substrate body, with alternate passages blocked at opposite end-faces. Specific wall-flow substrates for use in the inventive process include thin porous walled honeycombs (monoliths) through which the fluid stream passes without causing too great an increase in back pressure or pressure drop across the article. Normally, the presence of a clean wall-flow article will create a back pressure of 0.036 psi to 10 psi.

The expression "coating" is to be understood to mean the application of catalytically active materials and/or storage components on a substantially inert substrate which may be constructed in the manner of an above-described wall-flow filter or flow-through monolith. The coating performs the actual catalytic function and contains storage materials and/or catalytically active metals which are usually deposited in highly dispersed form on temperature-stable, large-surface-area metal oxides (see below). The coating is carried out usually by means of the application of a liquid coating medium (slurry) of the storage materials and/or catalytically active components—also referred to as a washcoat—onto and/or into the wall of the inert substrate. After the application of the liquid coating medium, the support is dried and if appropriate calcined at elevated temperatures. The coating may be composed of one layer or constructed from a plurality of layers which are applied to a substrate one above the other (in multi-layer form) and/or offset with respect to one another (in zones).

The liquid coating medium is, for example, a suspension or dispersion for coating exhaust gas catalysts (flow-through monoliths or filters) for motor vehicles ("washcoat") which contains catalytically active components or precursors thereof and inorganic oxides such as zeolites, like mentioned above or other 8-ring zeolites, aluminum oxide, titanium dioxide, zirconium oxide or a combination thereof, it being possible for the refractory oxides to be doped with silicon or lanthanum, for example. The zeolites can be exchanged with metal cations like Fe and/or Cu. Oxides of vanadium, chromium, manganese, iron, cobalt, copper, zinc, nickel or rare earth metals such as lanthanum, cerium, praseodymium, neodymium, promethium, samarium, europium, gadolinium, terbium, dysprosium, holmium, erbium, thulium, ytterbium or combinations thereof can be used as catalytically active components. Noble metals such as platinum, palladium, gold, rhodium, iridium, osmium, ruthenium and combinations thereof can also be used as catalytically active components. These metals can also be present as alloys with one another or with other metals or as oxides. The metals can also be present as precursors, such as nitrates, sulfites or organyls of said noble metals and mixtures thereof, and, in particular, palladium nitrate, palladium sulfite, platinum nitrate, platinum sulfite or Pt(NH3)4(NO3)2 can be used in the liquid coating medium. By calcination at about 400° C. to about 700° C., the catalytically active component can then be obtained from the precursor. To coat a substrate for the production of automotive exhaust gas catalysts, a suspension or dispersion of an inorganic oxide can initially be used for coating, after which, in a subsequent coating step, a suspension or dispersion which contains one or more catalytically active components can be applied. However, it is also possible for the liquid coating medium to contain both of these components. The liquid coating medium often has a solids content of between 35% and 52% and a viscosity of 9.5 cP-50 cP, preferably 25 cP-45 cP at 20° C.

The presented data shows the temperature dependency of vanadium release of an V-SCR technology. The measurement follows the recommended procedure by the EPA. γ-Alumina quantitatively adsorbs released vanadium. The work from Chapman et al. indicates this also.

A similar adsorption behavior is observed with FeZeo containing ASC. Long time burner aging at elevated temperature exhibits a strong axial gradient with almost no vanadium found in the outlet of the ASC. Therefore it is concluded that for given operation conditions no vanadium will leave the after treatment system and that the public will not be exposed to otherwise possible vanadium emissions. It can be taken as a surprise that the applied zeolite seems to be as effective as high surface area γ-alumina.

EXAMPLE

To evaluate the Vanadium release properties of V-SCR catalysts technologies the sampling and analytical method for the analysis of sublimation based vanadium from SCR catalysts proposed by US-EPA is applied (Recommendation of Sampling and Analytical Method for the Analysis of Sublimation Based Vanadium from SCR Catalysts; http://www.epa.gov/otaq/cert/documents/nrciscr-web-conf.2011-07-25.pdf).

Vanadium Release Measurement

In principle, the Vanadium catalyst is mounted into a quartz glass tube and exposed to a gas mixture at a constant temperature. Behind the catalyst an adsorber bed is installed which quantitatively adsorbs all vanadium. Chapman et al. showed that high surface area γ-alumina yields quantitative adsorption of released vanadium compounds (Behavior of Titania-supported Vanadia and Tungsta SCR Catalysts at High Temperatures in Reactant Streams: Tungsten and Vanadium Oxide and Hydroxide Vapor Pressure Reduction by Surficial Stabilization. *Applied Catalysis A: General*, 2011, 392, 143-150). After a given measurement time the adsorber bed is analyzed for trapped vanadium. The measurement is repeated at different temperatures. For each temperature a new V-SCR sample and adsorber bed is installed into the quartz glass tube.

Evaluation of Vanadium Release in a Given after Treatment System Configuration

Figure 2:
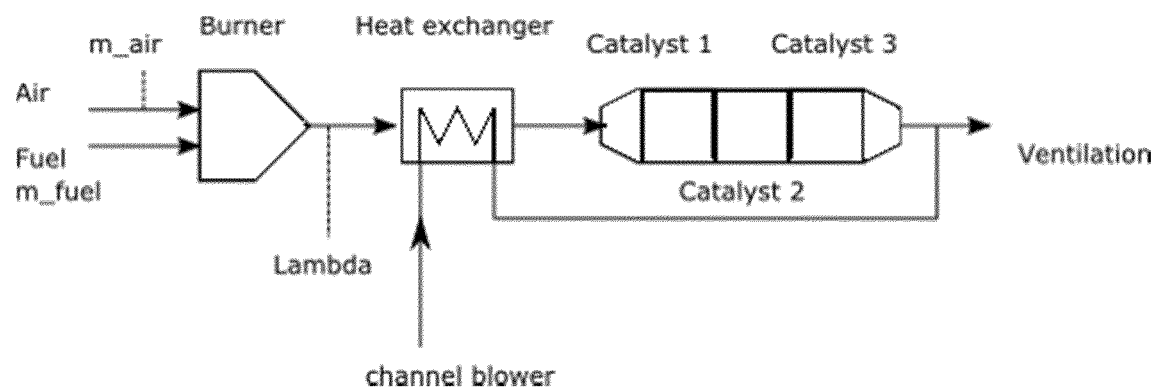
FIG. 2 shows the catalyst set-up for the long time aging.
Figure 3:
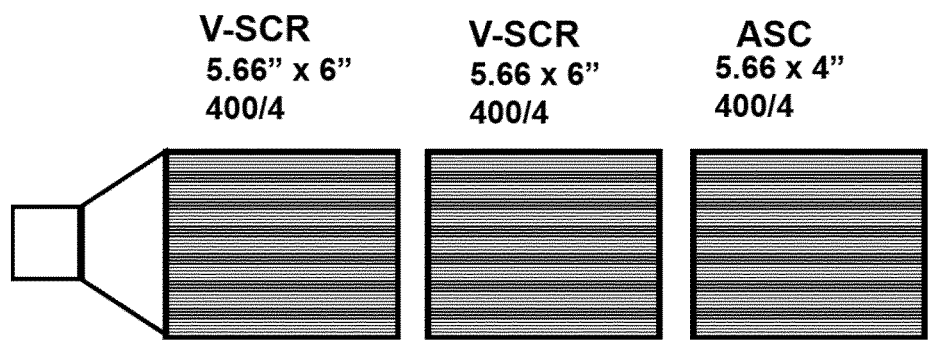
FIG. 3 shows the ASC located in the same canning as the SCR-catalyst.

In a commercial after treatment system, the V-SCR system is the first component of the system. Downstream of the V-SCR catalyst positioned in a flow-through catalyst is the ASC. To assess the release of vanadium out of the after treatment system long time aging in a burner setup is conducted. In principle, a V-SCR is positioned upstream of an ASC in an exhaust stream of a Diesel burner (FIG. 2). The aging is done at constant temperature for at least 100 h. Afterwards the ASC is analyzed for vanadium. The experiment is repeated at different temperatures with a further V-SCR and ASC.

Figure 1:
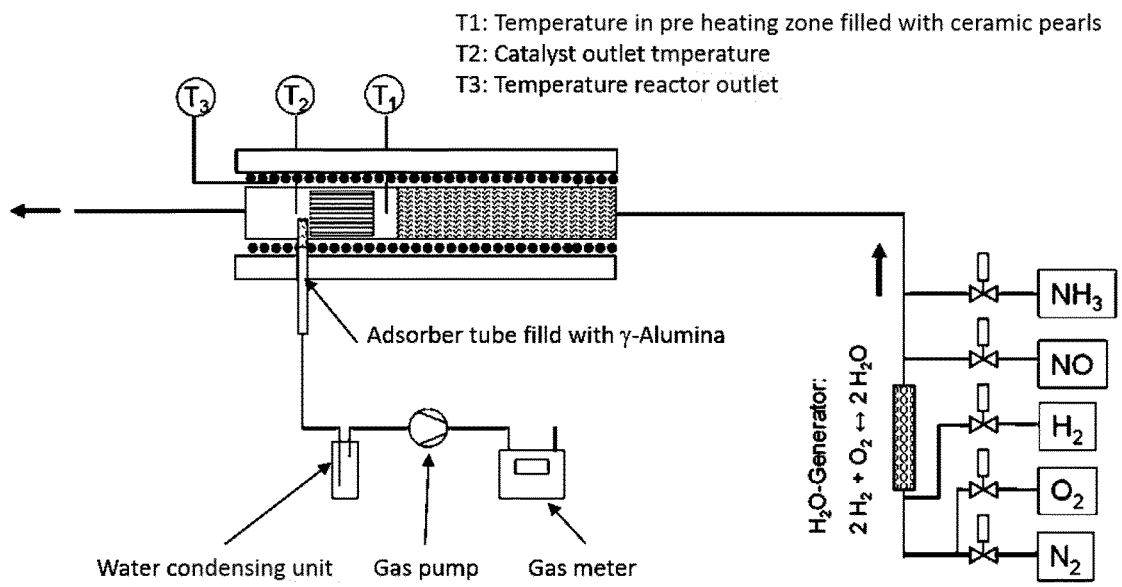
FIG. 1 shows the set-up of the aging equipment.

The catalyst sample is aged within a synthetic gas bench (FIG. 1). For this a drill core (size Ø 1", length 1.6") of catalyst is mounted within a quartz tube reactor. Directly behind the catalyst a quartz glass tube is positioned filled with γ-alumina. Through the tube a constant gas flow of exhaust gas stream is pumped. After condensation of water the flow is measured by means of a gas meter. With this setup of the experiment the gas flow of exhaust over the adsorption bed is measured precisely. FIG. 1 shows the set-up of the aging equipment.

After installation, the reactor is purged with $N_2$ and heated up to the desired measurement temperature. Then the aging gas mixture is applied (Table 1). The aging time is 24 h. During aging the gas flow is measured with a gas meter. After finishing the aging the adsorber material is analyzed for vanadium.

TABLE 1

| Gas Mixture during aging | |
|---|---|
| Gas | Value |
| NO | 500 pm |
| NH3 | 500 ppm |
| O2 | 10 vol.-% |
| H2O | 5 vol.-% |
| N2 | Balance |
| GHSV | 30,000 1/h |

Measurement of the next temperature point is done with new catalyst sample and new adsorber material. As adsorber material, a lab grade γ-alumina is used. Temperatures measured are:

The reference is a commercial V-SCR coated catalyst. Other samples including the V-SCR-catalyst are equipped with a coated substrate with a potential V-SCR scavenger function. Table 2 displays the measured samples.

TABLE 2

| Measured sample and aging | |
|---|---|
| Sample | Aging |
| V-SCRa | 580° C., 610° C. |
| V-SCR + γ-alumina | 580° C., 610° C. |
| V-SCR + FeBEA-ASC | 580° C., 610° C. |
| V-SCR + white zeolite | 580° C., 610° C. |

According to the EPA proposal, the vanadium loss shall be given as gas phase concentration in $\mu g/m^3 N$. By measuring the gas flow and analyzing the Vanadium content in the adsorber this value is calculates as follows:

$$Vanadia_{Gas}[\mu g/m_N^3] = \frac{n_{Vanadia}[\mu g]}{V_{Gas}[m_N^3]}$$

To assess the risk of vanadium emission of an after treatment system configured as depicted in FIG. 2, a long time aging at a burner aging test rig was applied. In principle, a V-SCR catalyst is positioned downstream in the exhaust of a Diesel burner. Directly downstream of the V-SCR catalyst a FeZeo-ASC is placed. After exposure the FeZeo-ASC is analyzed for vanadium.

Catalyst 1 and 2, respectively, are V-SCR catalysts and on position of Catalyst 3 a FeBEA containing ammonia slip catalyst (ASC) is used. FIG. 2 shows the catalyst set-up for the long time aging.

The catalysts are mounted in a canning and installed in the exhaust stream of the burner. The burner is started and the exhaust temperature is regulated to the desired temperature. The temperature control is based on SCR outlet. After the aging, the ASC brick is dismounted and analyzed. To assess the axial gradient the catalyst is cut into three parts yielding inlet, middle and outlet of the ASC brick.

The test matrix is as follows:

| Temperatur | Duration | | |
|---|---|---|---|
| [° C.] | 100 h | 200 h | 300 h |
| 475 | X | x | x |
| 550 | X | X | x |
| 600 | X | x | x |

V-Analytics:

The crucial point for assessment of vanadium release is the analytic measurement of this element. For both studies, inductively coupled plasma optical emission spectrometry (ICP-OES) method according to DIN EN ISO 11885 (2009) is used. The method has three general steps:

Sample preparation: Samples are grinded to fine powder

Sample dissolving: The powders are solved in mineral acids using pressure digestion until a clear solution is received Measurement with ICP-OES To ensure the quality of the measurement also the γ-alumina material is tested.

Results:

Catalyst samples were aged at different temperatures according method described above. Analytic values of the γ-alumina material are displayed in Table 3.

TABLE 3

V-concentration in exhaust stream downstream SCR at different aging in μg/m³$_N$

| Catalyst Sample | V-concentration in Gas Phase [μg/Nm³] at | |
|---|---|---|
| | 580 [° C.] | 610 [° C.] |
| V-SCR | 4.3 | 8.3 |
| V-SCR + γ-alumina | <0.05 | <0.05 |
| V-SCR + FeZeo-ASC | <0.05 | <0.05 |
| Detection limit | 0.05 | |

Tests with the set-up according to FIG. 2 were conducted at different temperatures and times. The ASC sample is cut into three portions leading to inlet, middle and outlet part. The catalyst samples are grinded to fine powder and Vanadium content measured with ICP-OES. As vanadium can be a contaminant of the cordierite substrate, a reference part from same substrate lot is analyzed as well. The reference sample yielded a vanadium-content of 46 ppm. This is seen as an offset for all measured values. This value is subtracted from the measured vanadium concentration of the ASC sample given in Table 4. The detection limit is given in Table 3.

TABLE 4

Vanadium concentration in ASC after burner aging

| Temperature [° C.] | Aging Time [h] | Vanadium concentration [ppm] | | |
|---|---|---|---|---|
| | | Inlet | Middle | Outlet |
| 475 | 100 | 50 | 4 | 0 |
| 550 | 100 | 129 | 14 | 0 |
| 600 | 100 | 307 | 38 | 2 |
| 475 | 200 | 64 | 6 | 0 |
| 550 | 200 | 186 | 24 | 2 |
| 600 | 200 | 614 | 116 | 13 |
| 475 | 300 | 118 | 12 | 0 |
| 550 | 300 | 261 | 35 | 3 |
| 600 | 300 | 866 | 222 | 43 |

Figure 4:
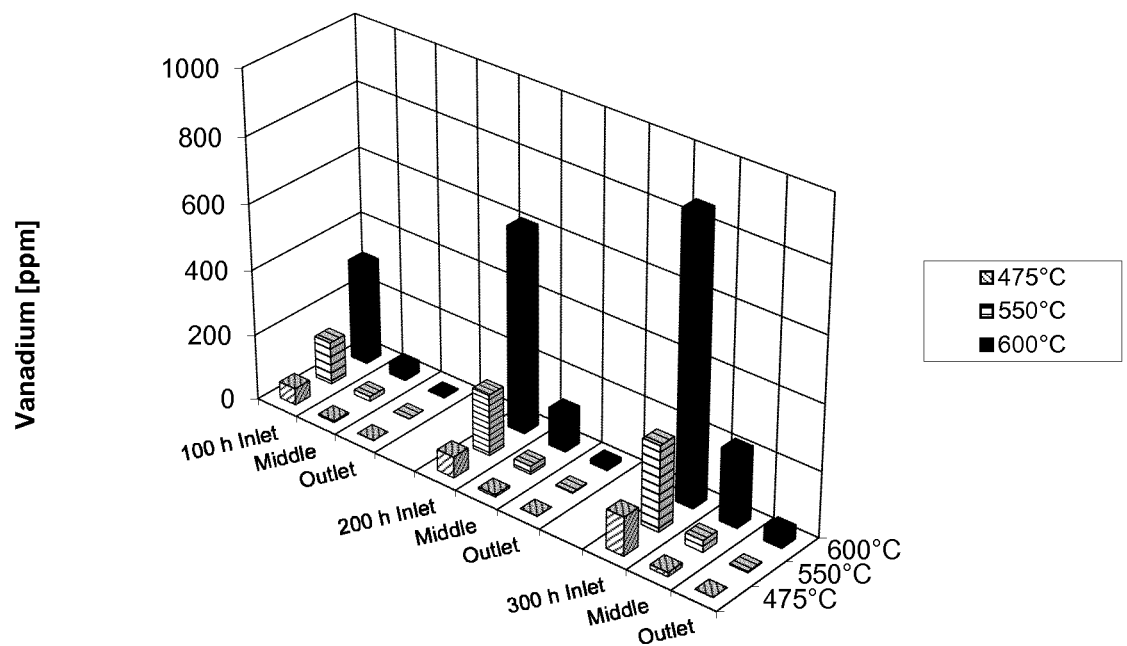
FIG. 4 shows the vanadium concentration in the samples tested.

The results are displayed in FIG. 4. All samples exhibit a strong axial gradient of vanadium. With increasing temperature, the vanadium concentration at the Inlet of the ASC increases. Also longer aging duration leads to an increasing vanadium concentration at the inlet. The axial gradient at given temperature and aging time shows that almost all vanadium is adsorbed directly in the inlet of the ASC. Even at elevated temperature only a small amount of vanadium can be detected at the outlet of the ASC.

Layout of the ASC-Catalyst:

The ASC used is prepared by coating a Pt containing first layer (1.6") onto the outlet of a 3"-flow-through substrate (400/4) with a Pt content of 5 g/ft³. In a second step a Fe-Beta-zeolith containing layer (3") is coated on top of that.

The invention claimed is:

1. An NH$_3$-SCR-system comprising a vanadium based upstream SCR-catalyst and a downstream ASC, with the ASC comprising a Cu- or Fe-exchanged BEA zeolite as a trap for volatile vanadium compounds, and wherein the ASC comprises platinum group metal and is designed such that the Cu- or Fe-exchanged BEA zeolite is positioned, at least to some extent, for contact with the exhaust gas with volatile vanadium compounds prior to exhaust contact with the platinum group metal of the ASC.

2. The NH$_3$-SCR-system according to claim 1, wherein the ASC is located in the same housing as the SCR-catalyst.

3. The NH$_3$-SCR-system according to claim 1, wherein the Cu- or Fe-exchanged BEA zeolite contains ion-exchanged and non-ion exchanged Cu or Fe-ions in a molar ratio of greater than 90:10.

4. The NH$_3$-SCR-system according to claim 1, wherein the Cu- or Fe-exchanged BEA zeolite is provided in a coating coated over an entire length of the ASC.

5. The NH$_3$-SCR-system according to claim 4, wherein the platinum group metal is provided in a noble metal layer and wherein the coating of Cu- or Fe-exchanged BEA zeolite extends over the noble metal layer as to provide for the prior contact with volatile vanadium compounds.

6. The NH$_3$-SCR-system according to claim 5 wherein the platinum group metal in the noble metal layer comprises Pt.

7. The NH$_3$-SCR-system according to claim 6 wherein the platinum group metal in the noble metal layer comprises only Pt.

8. The NH$_3$-SCR-system according to claim 7, wherein the noble metal layer is entirely covered over by the coating of Cu- or Fe-exchanged BEA zeolite.

9. The NH$_3$-SCR-system according to claim 1 wherein the ASC is a coating of Fe-exchanged BEA zeolite.

10. The NH$_3$-SCR-system according to claim 1 wherein the ASC is a coating of Cu-exchanged BEA zeolite.

11. A method of catalytic treatment of exhaust gas comprising passing exhaust gas through the NH$_3$-SCR-system of claim 1.

12. The method of claim 11 wherein the exhaust gas is diesel exhaust gas and the diesel exhaust gas at an outlet of the NH$_3$-SCR-system has a measured zero ppm Vanadium concentration at 475° C. exhaust gas temperature level as measured at an exit point of the vanadium based upstream SCR-catalyst.

13. A method of assembling the NH$_3$-SCR-system of claim 1 comprising positioning each of the vanadium based upstream SCR-catalyst and the downstream ASC within an exhaust passageway.

14. An NH$_3$-SCR-system comprising a first and a second vanadium based SCR-catalyst and an ASC positioned downstream of both the first and second vanadium based SCR-catalysts, with the ASC comprising a Cu- or Fe-exchanged BEA zeolite as a trap for volatile vanadium compounds, and wherein the ASC comprises platinum group metal and is designed such that the Cu- or Fe-exchanged BEA zeolite is positioned, at least to some extent, for contact with exhaust gas with volatile vanadium compounds prior to exhaust gas contact with the platinum group metal of the ASC.

15. The NH$_3$-SCR-system according to claim 1, wherein the Cu- or Fe-exchanged BEA zeolite is positioned so as to entirely come in first contact with the exhaust gas with volatile vanadium prior to exhaust gas contact with the platinum group metal.

16. The NH$_3$-SCR-system according to claim 1 wherein the platinum group metal is in an amount of 3 to 7 g/ft³.

17. The NH$_3$-SCR-system according to claim 1 wherein the Cu- or Fe-exchanged BEA zeolite is in a continuous layer above a layer containing the platinum group metal such that the Cu- or Fe-exchanged BEA zeolite entirely comes in first contact with the exhaust gas with volatile vanadium prior to exhaust gas contact with the platinum group metal.

18. The $NH_3$-SCR-system according to claim 1 wherein the vanadium based upstream SCR-catalyst and the downstream ASC are provided on a common brick.

19. An $NH_3$-SCR-system comprising a vanadium based upstream SCR-catalyst and a downstream ASC, with the ASC comprising a Cu- or Fe-exchanged large pore zeolite as a trap for volatile vanadium compounds, and wherein the ASC comprises platinum group metal and is designed such that the Cu- or Fe-exchanged large pore zeolite is provided in a layer overlying a layer containing the platinum group metal.

20. The $NH_3$-SCR-system according to claim 19 wherein the large pore zeolite is BEA.

21. The $NH_3$-SCR-system according to claim 1 wherein Cu- or Fe-exchanged BEA zeolite is the sole zeolite of the ASC.

22. The $NH_3$-SCR-system according to claim 1 wherein the platinum group metal is in an amount of 2 to 10 $g/ft^3$.

\* \* \* \* \*